Figure 1:
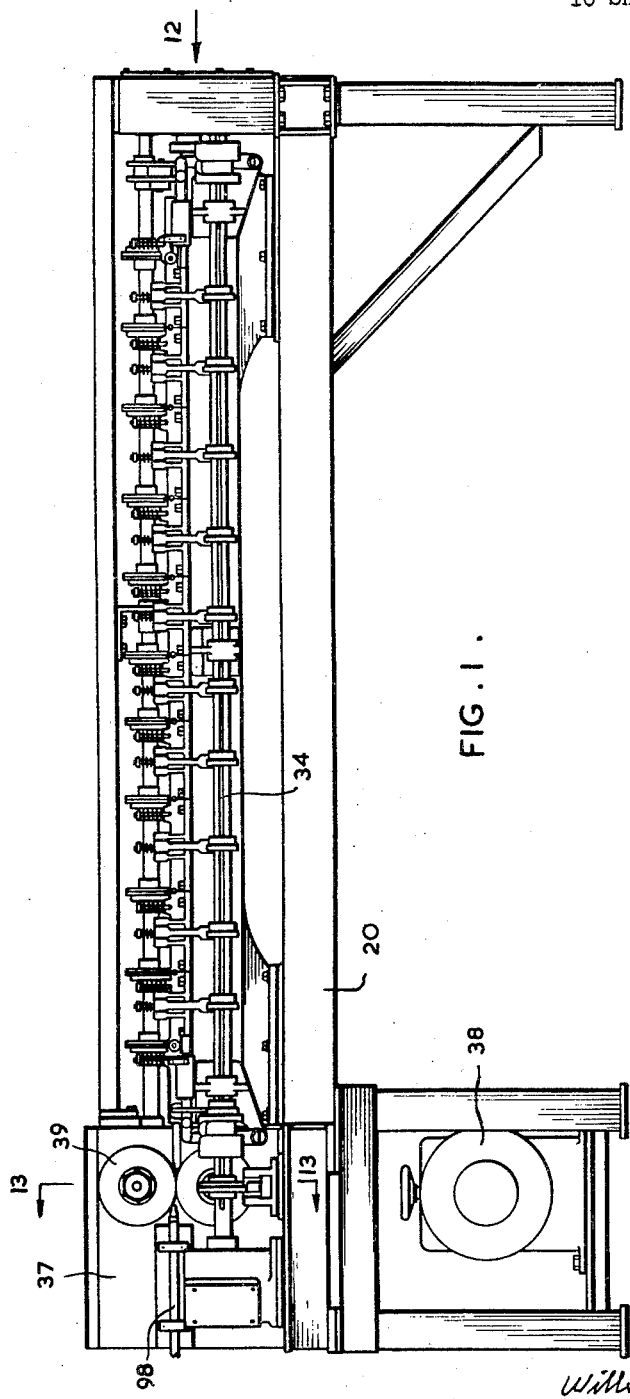

Dec. 25, 1962 W. THOMPSON ET AL 3,070,135
MACHINE FOR PRODUCING COMPOSITE WIRE STRUCTURES
Filed April 15, 1959 16 Sheets-Sheet 1

Dec. 25, 1962 W. THOMPSON ET AL 3,070,135
MACHINE FOR PRODUCING COMPOSITE WIRE STRUCTURES
Filed April 15, 1959 16 Sheets-Sheet 2

Inventors
William Thompson
Neville B. Sykes
By Ralph B. Stewart
attorney

Dec. 25, 1962 W. THOMPSON ET AL 3,070,135
MACHINE FOR PRODUCING COMPOSITE WIRE STRUCTURES
Filed April 15, 1959 16 Sheets-Sheet 3

Inventors
William Thompson
Neville B. Sykes
By Ralph B. Stewart
Attorney

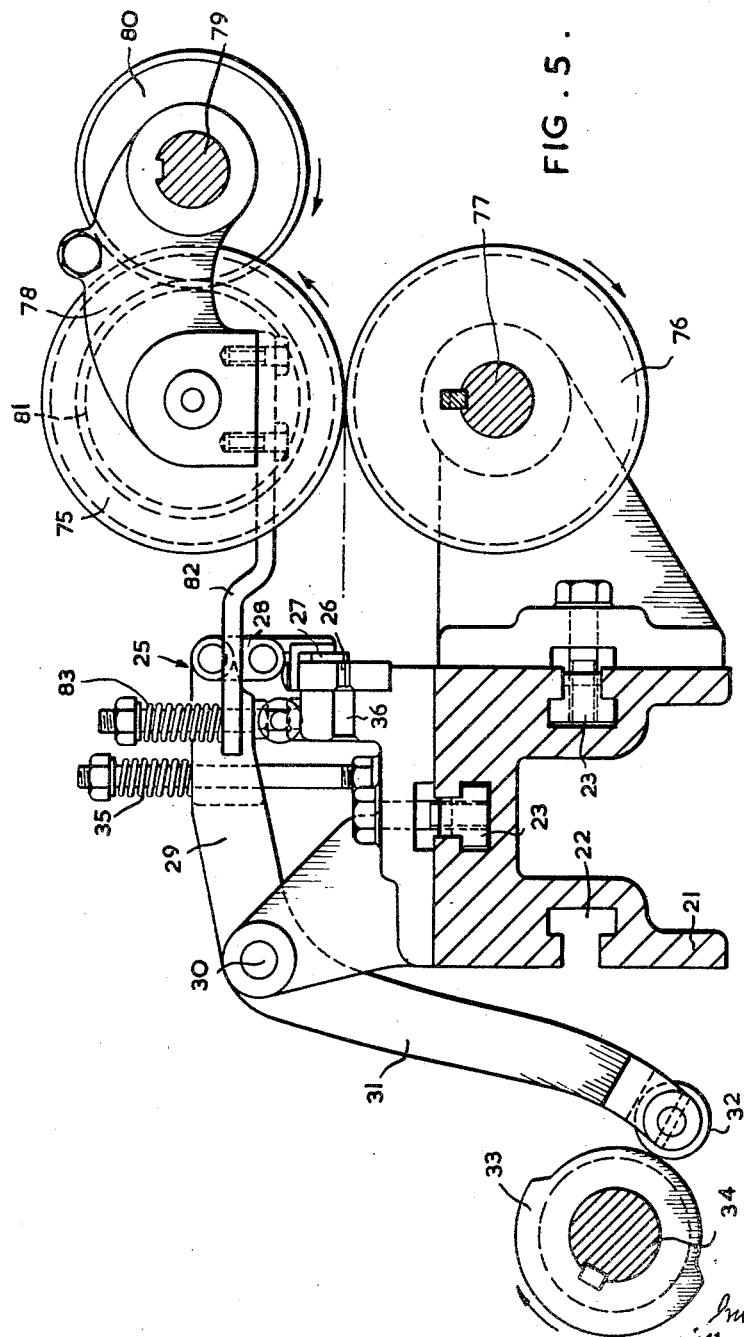

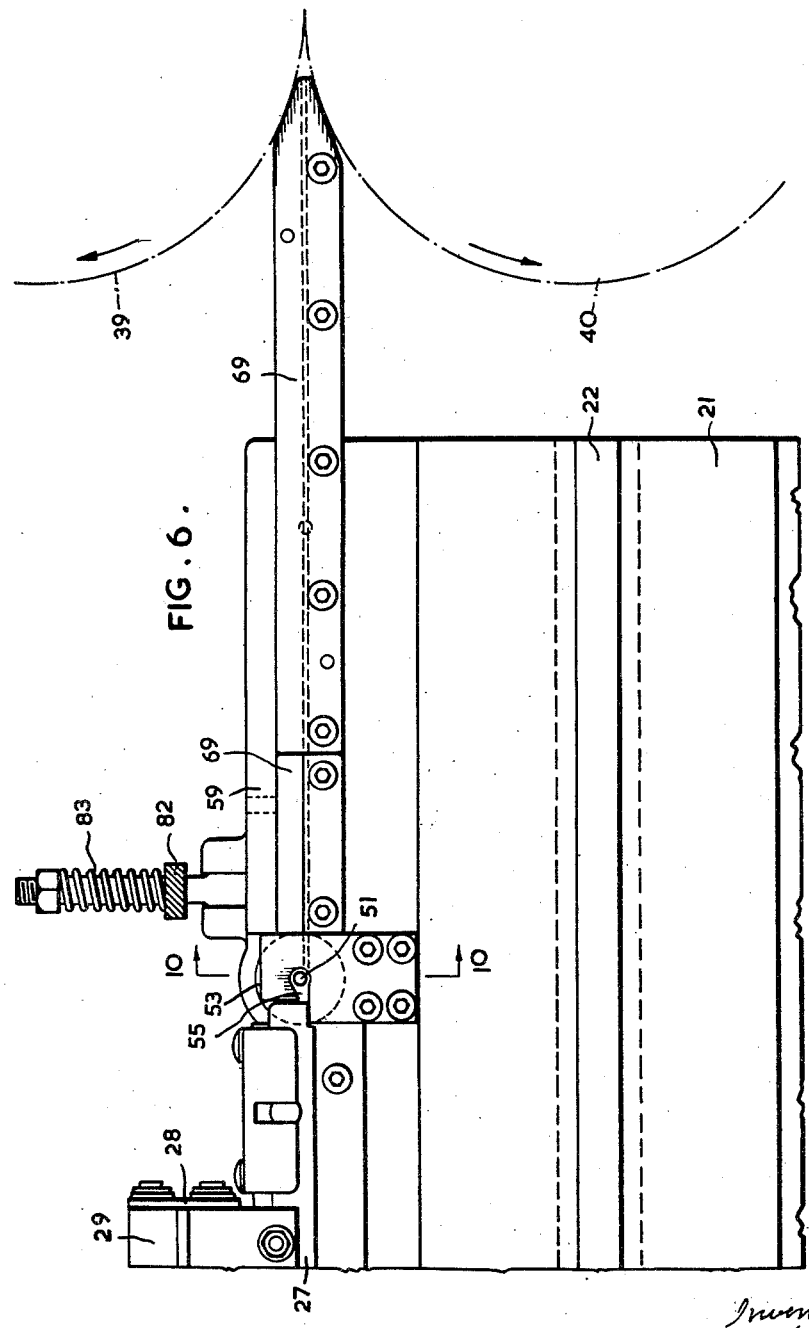

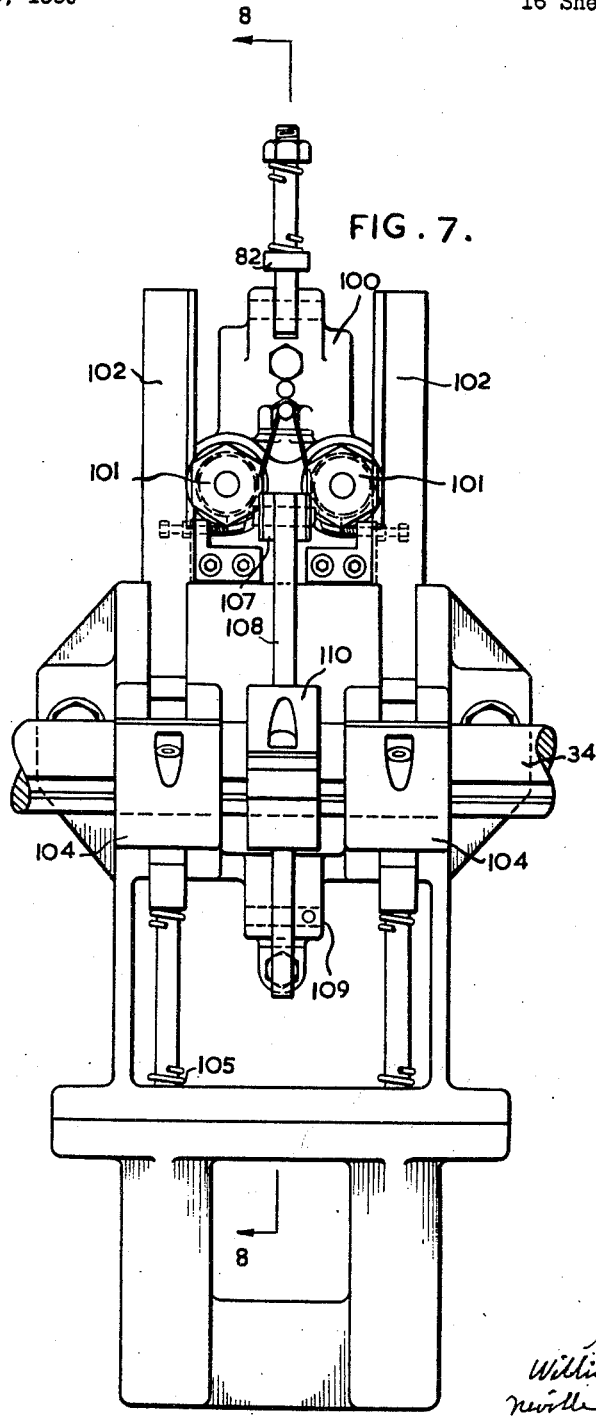

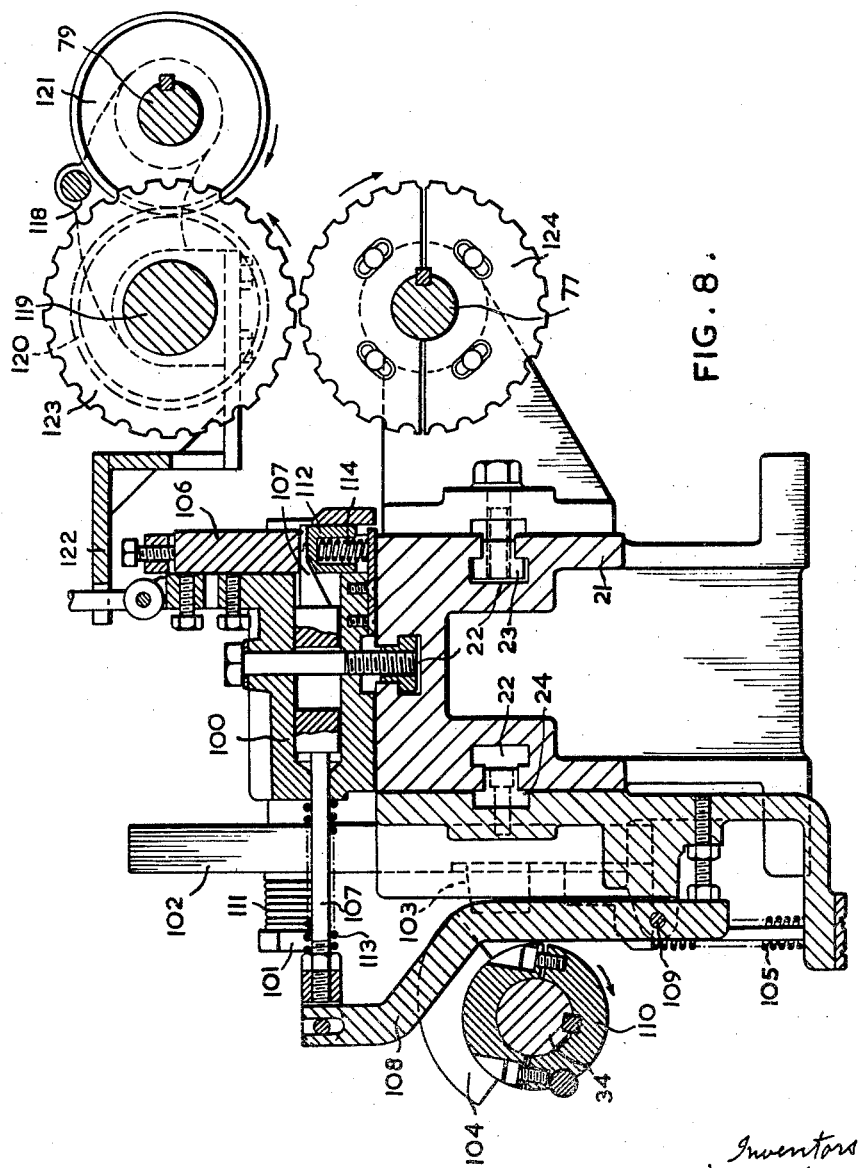

Dec. 25, 1962   W. THOMPSON ET AL   3,070,135
MACHINE FOR PRODUCING COMPOSITE WIRE STRUCTURES
Filed April 15, 1959   16 Sheets-Sheet 9

Inventors
William Thompson
Neville B. Sykes
By Ralph B. Stewart
Attorney

Dec. 25, 1962 W. THOMPSON ET AL 3,070,135
MACHINE FOR PRODUCING COMPOSITE WIRE STRUCTURES
Filed April 15, 1959 16 Sheets-Sheet 15

United States Patent Office

3,070,135
Patented Dec. 25, 1962

3,070,135
MACHINE FOR PRODUCING COMPOSITE WIRE STRUCTURES
William Thompson, Macclesfield, and Neville Bromley Sykes, Romiley, England, assignors to Slumberland (Developments) Limited, Stockport, Cheshire, England, a British company
Filed Apr. 15, 1959, Ser. No. 806,670
Claims priority, application Great Britain Apr. 15, 1958
5 Claims. (Cl. 140—3)

This invention relates to a material for incorporation in mattresses and other upholstered articles, this material, which is hereinafter referred to, for convenience, as support material, comprises a grid or lattice of longitudinally extending flexible cords, for example of paper cord, linked by transversely extending wires which pierce at least the intermediate cords, that is the cords other than the marginal cords, the ends of the wires being crimped to these marginal cords.

The support material is mainly used in interior-spring mattresses to isolate the stuffing from the springs and to distribute the load on the mattress so that the individual coil springs cannot be felt through the stuffing.

The principal object of the invention is to provide new or improved apparatus for manufacturing support material, and other objects achieved by the invention will become apparent as the description proceeds.

According to the present invention there is provided support material manufacturing apparatus comprising a base, alternately operable wire feed means and support material advance means associated with the base, the base having an open mouthed wire guide channel and cord guide passageways transverse to the wire guide channel and communicating with this channel, the mouth of the channel facing the direction of support material advance, shutter means closing the mouth of the wire guide channel between the cord guide passageways during operation of the wire feed means but opening the said mouth at least during operation of the support material advance means, wire severing means disposed between the wire feed means and the wire guide channel, and means for crimping the ends of the severed lengths of wire to the marginal cords.

Figure 2:
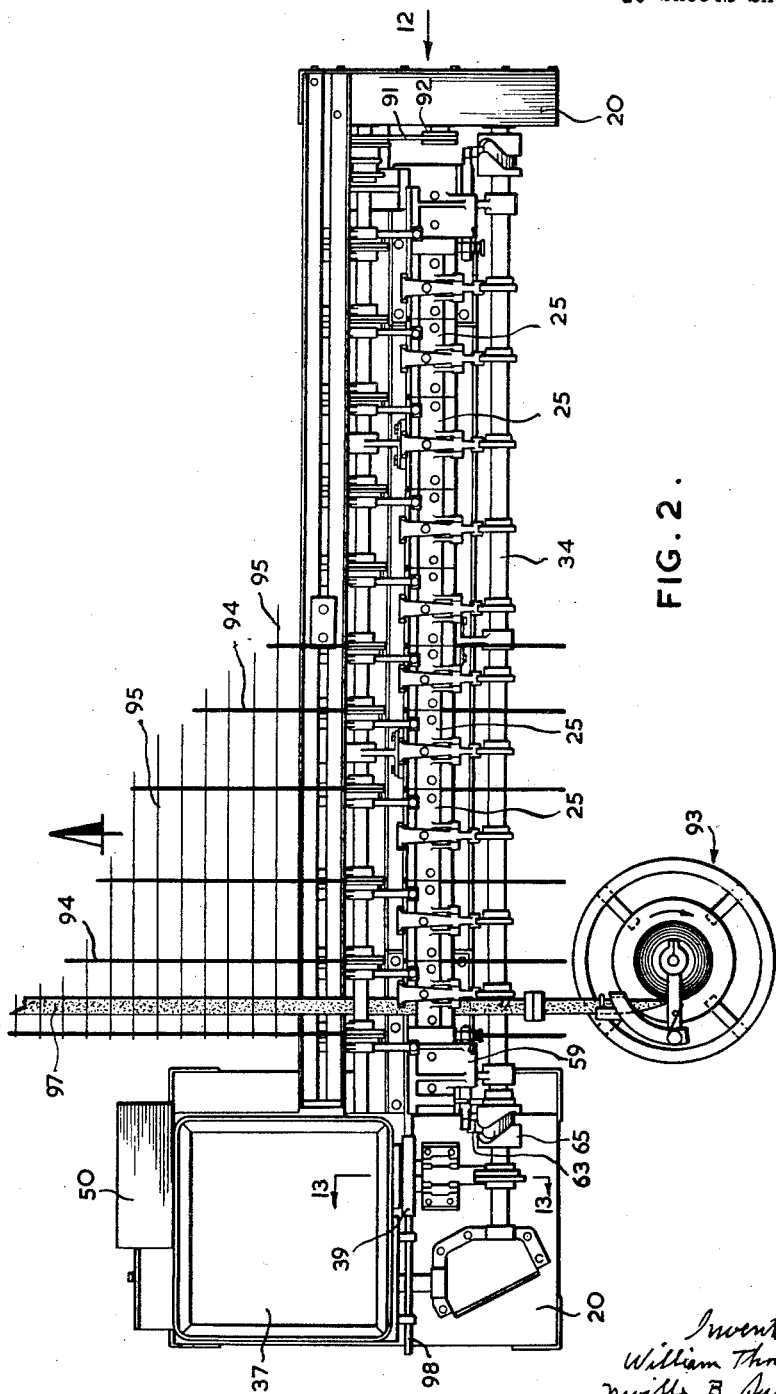
Figure 4:
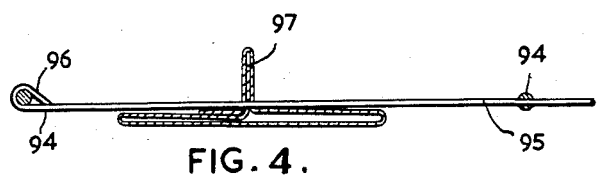
Figure 3:
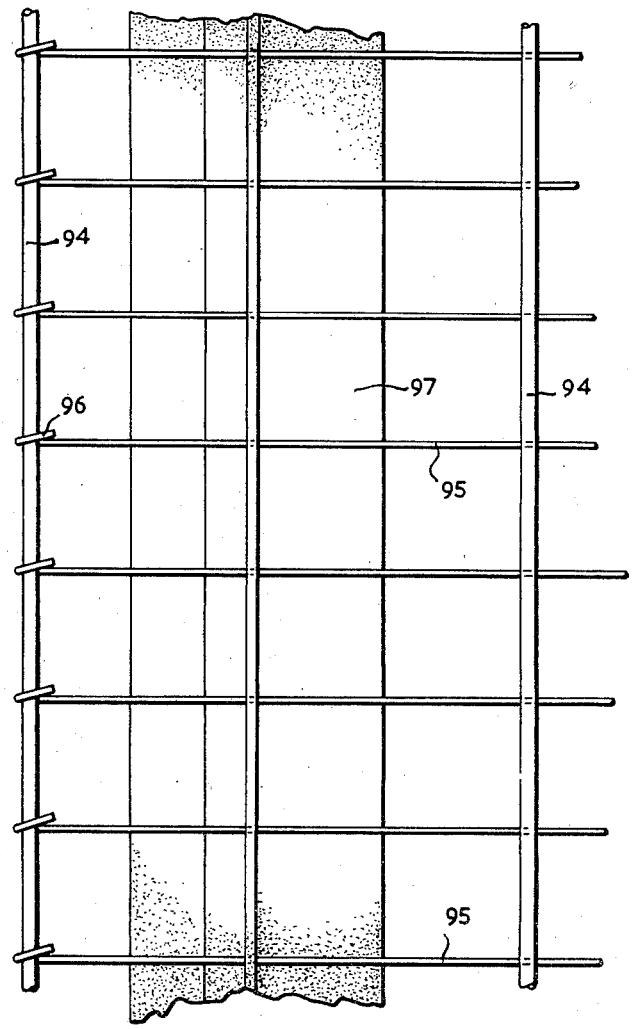
Figure 9:
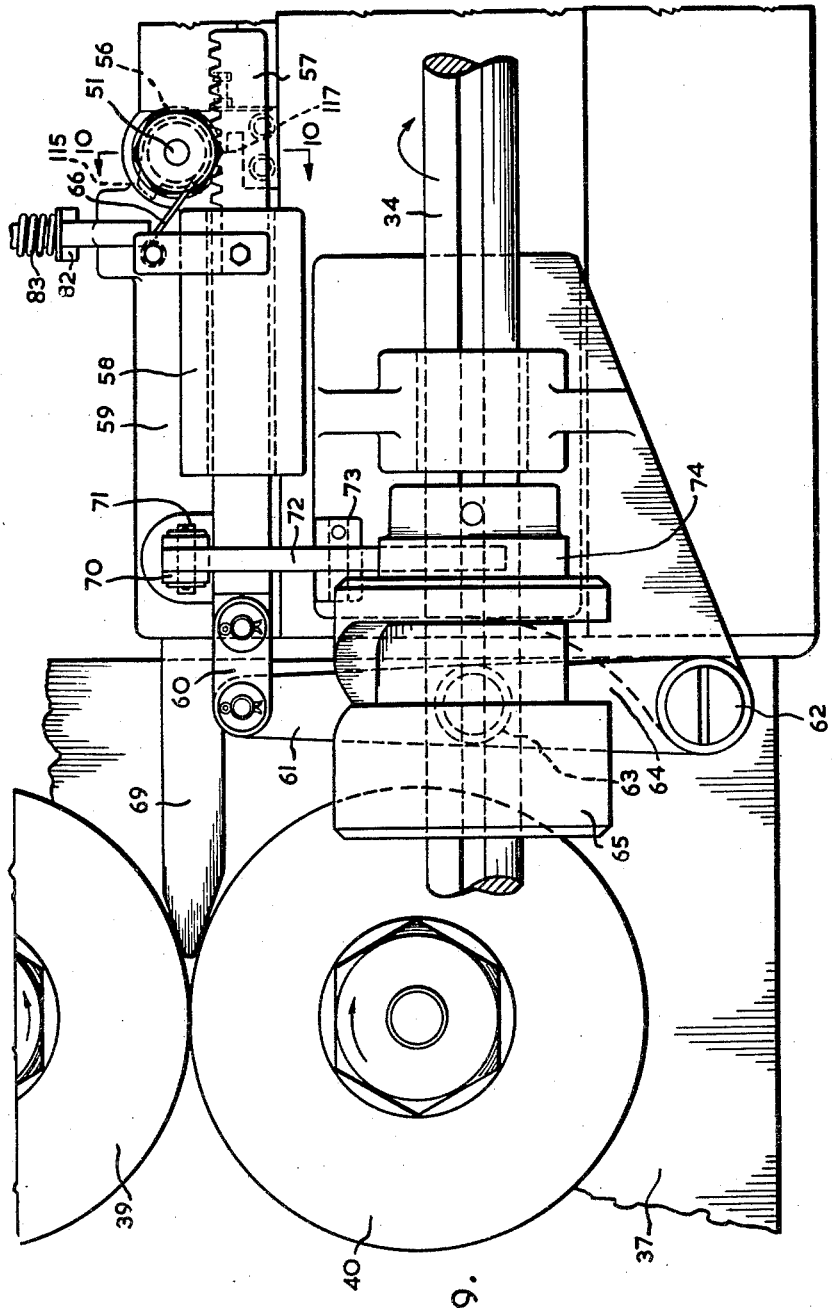
Figure 10:
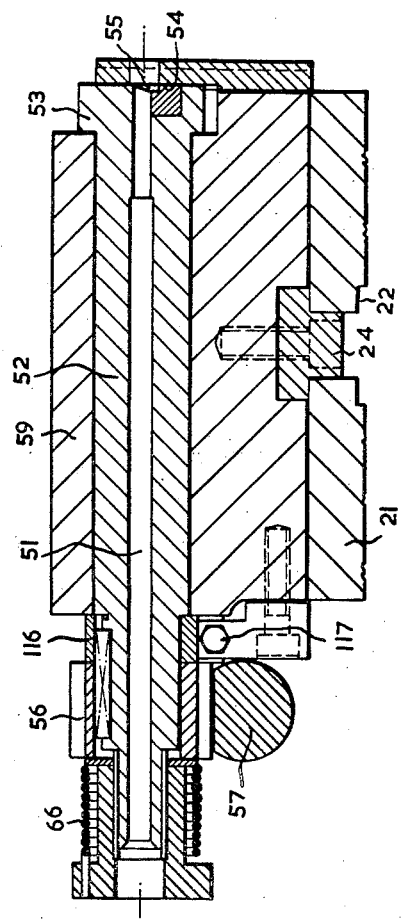
Figure 11:
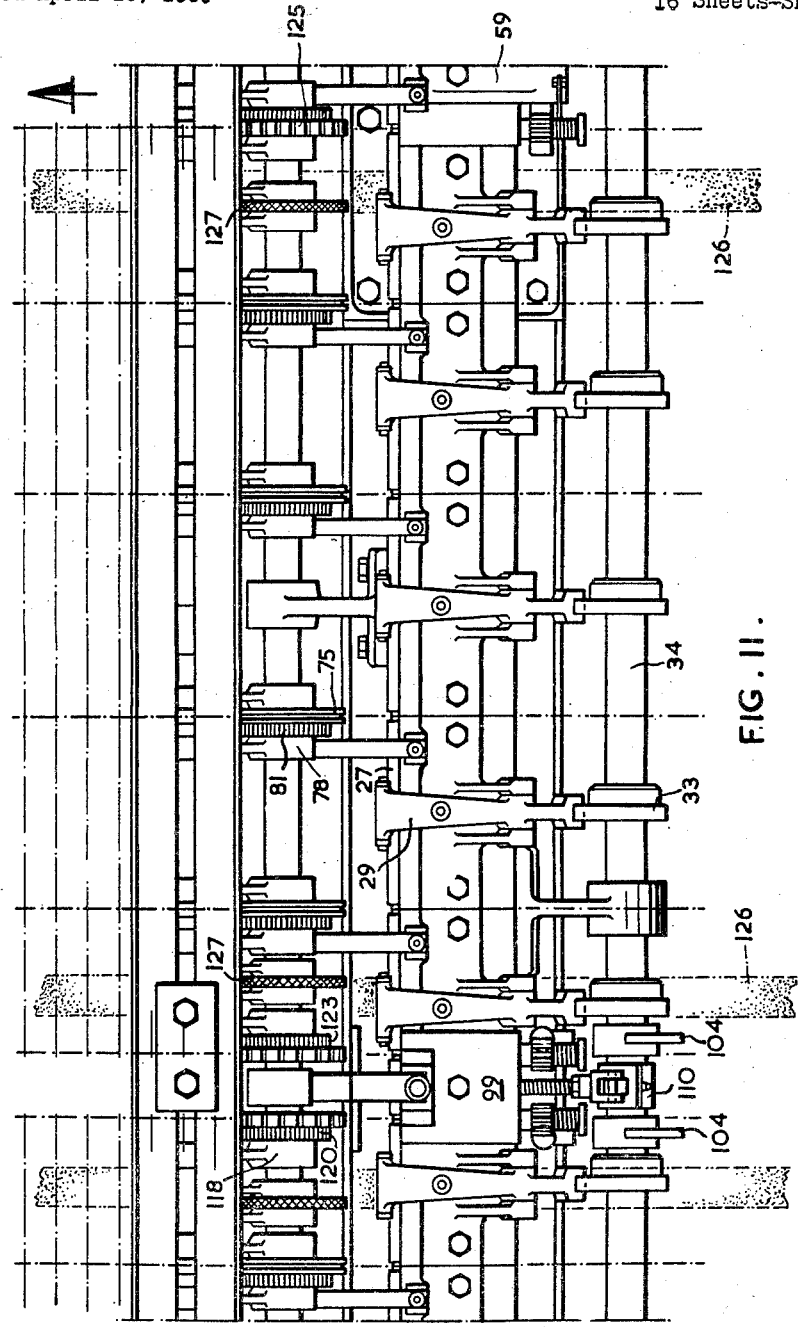
Figure 12:
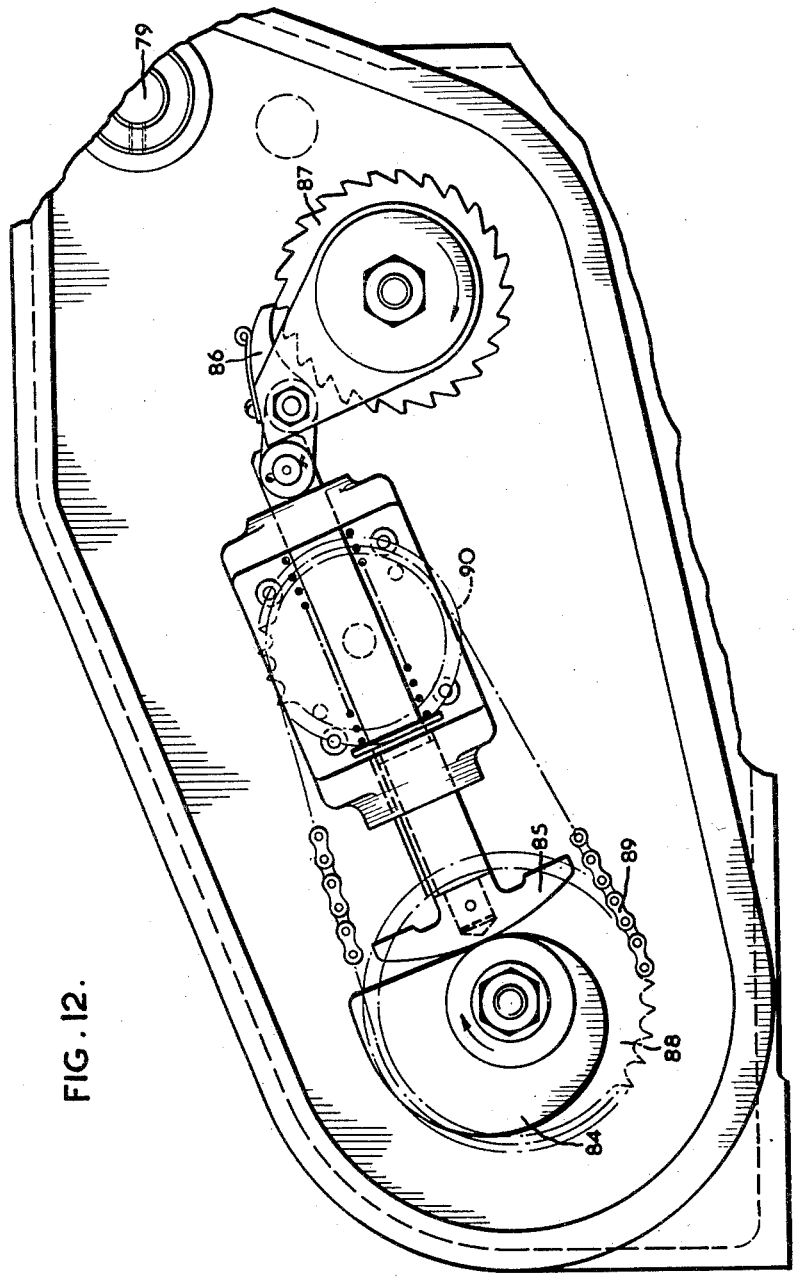
Figure 13:
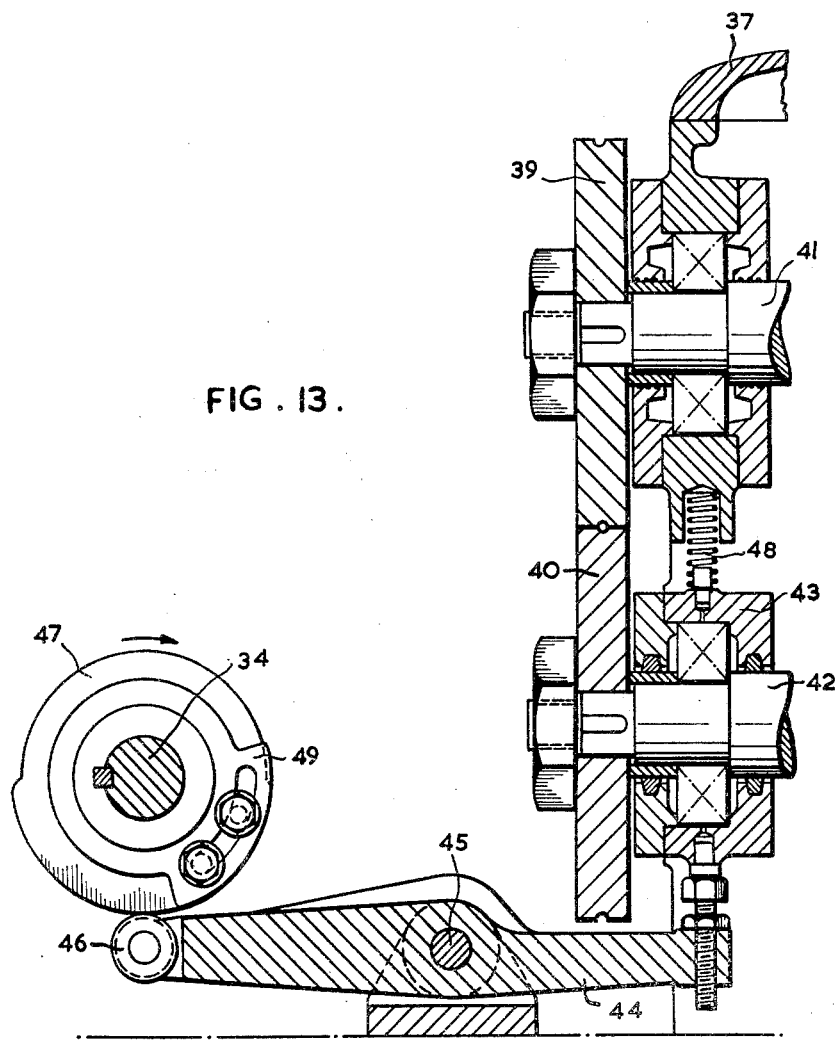
Figure 14:
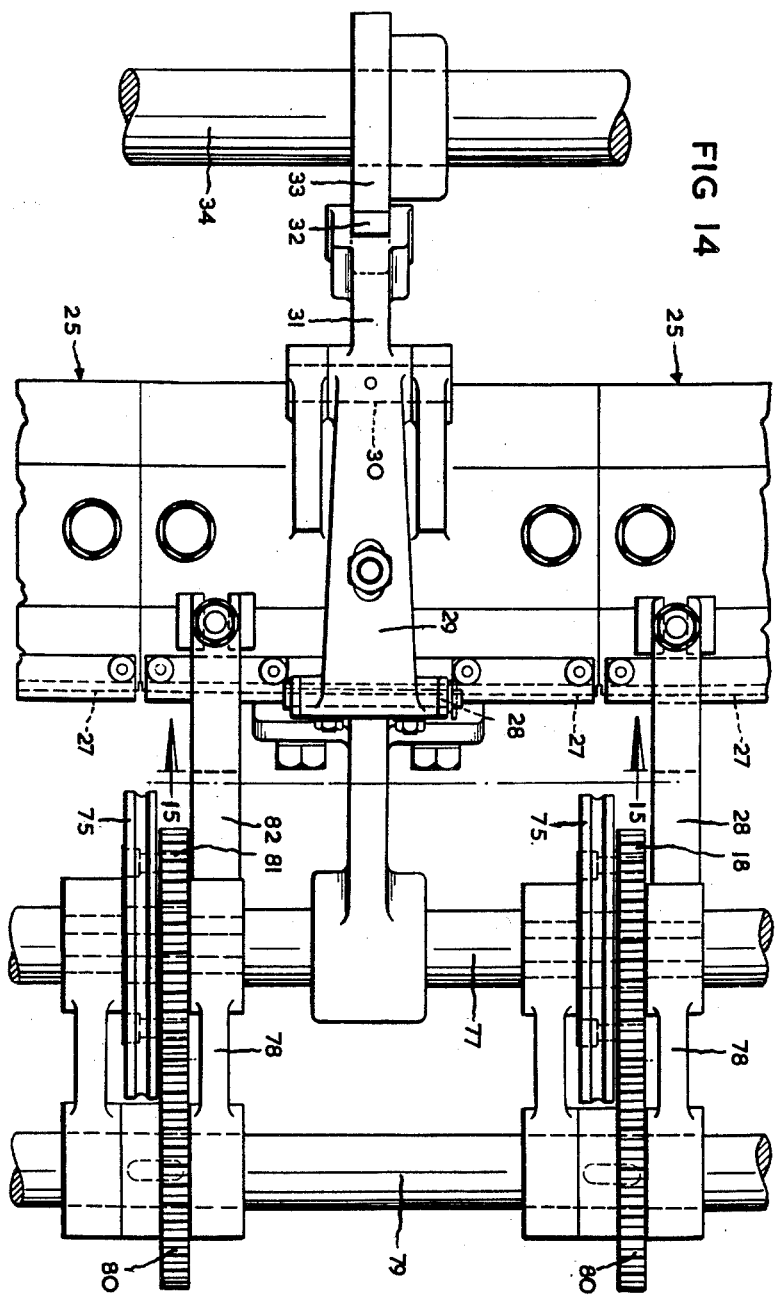
Figure 15:
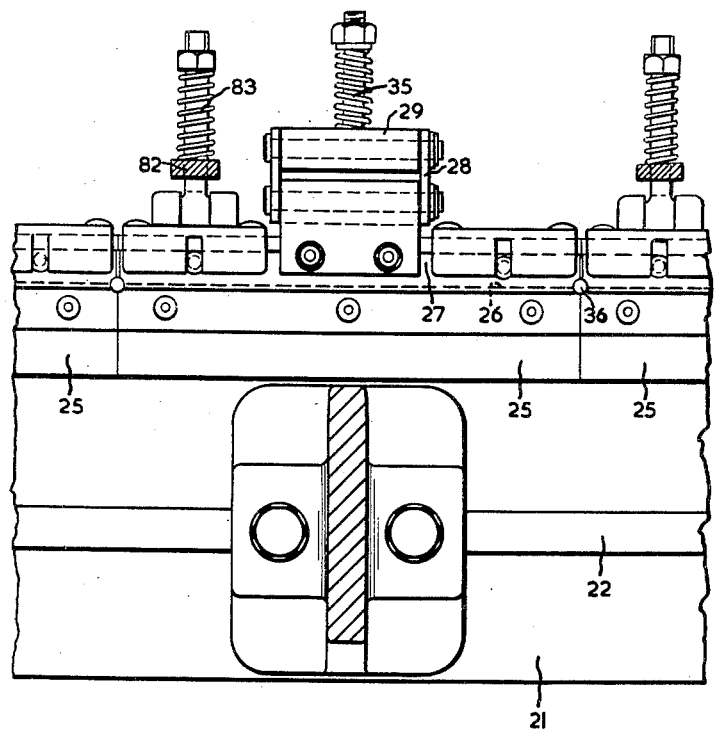
Figure 16:
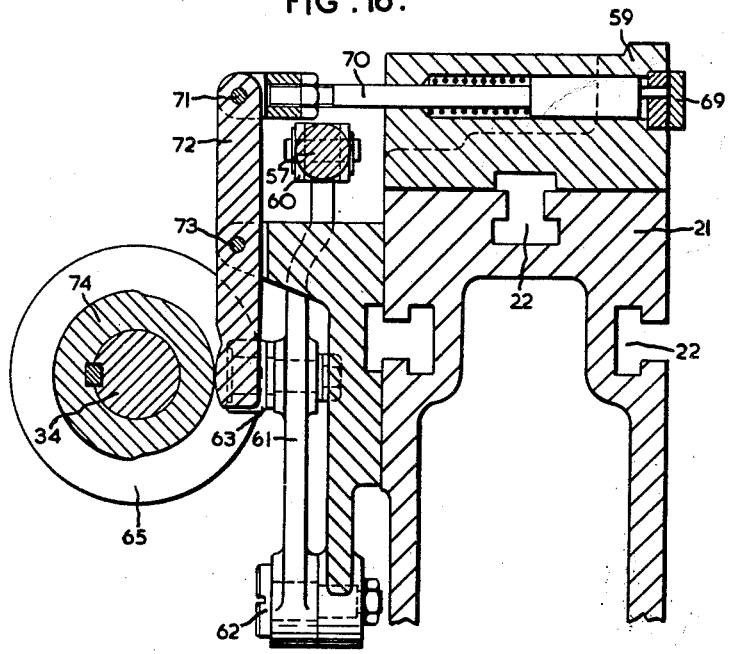
Figure 17:
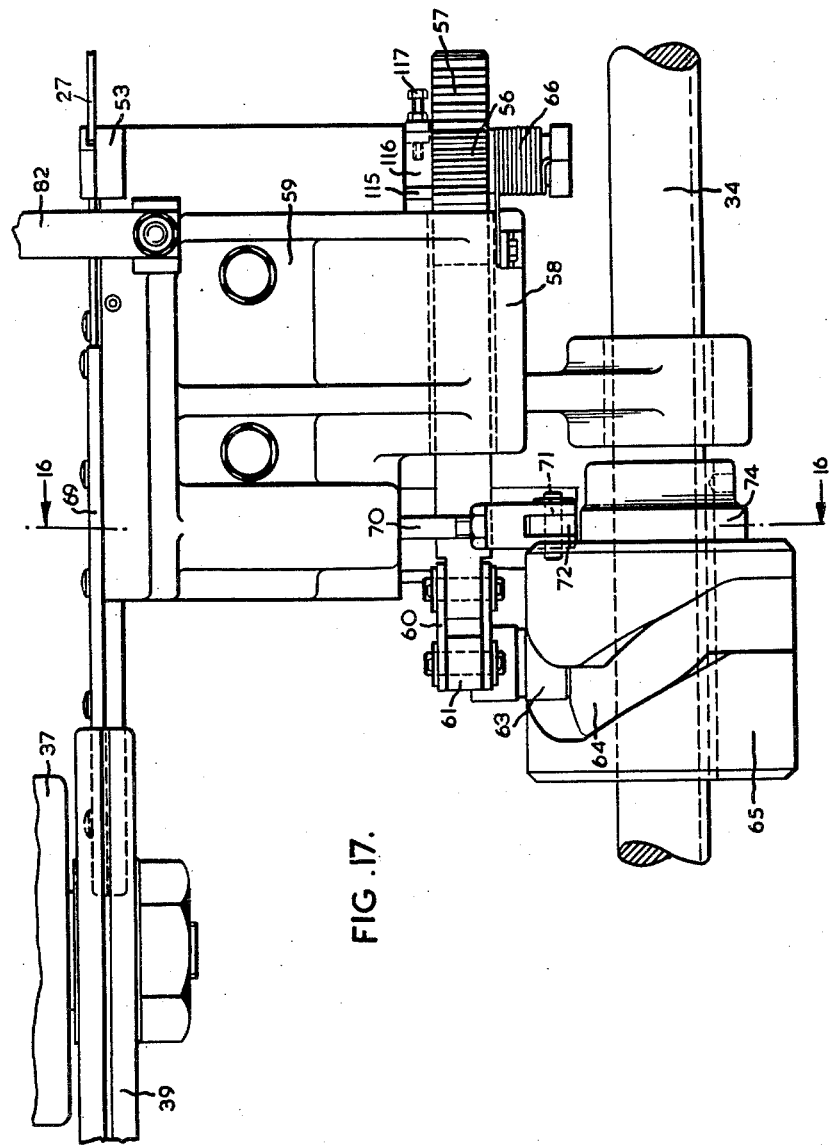
Figure 18:
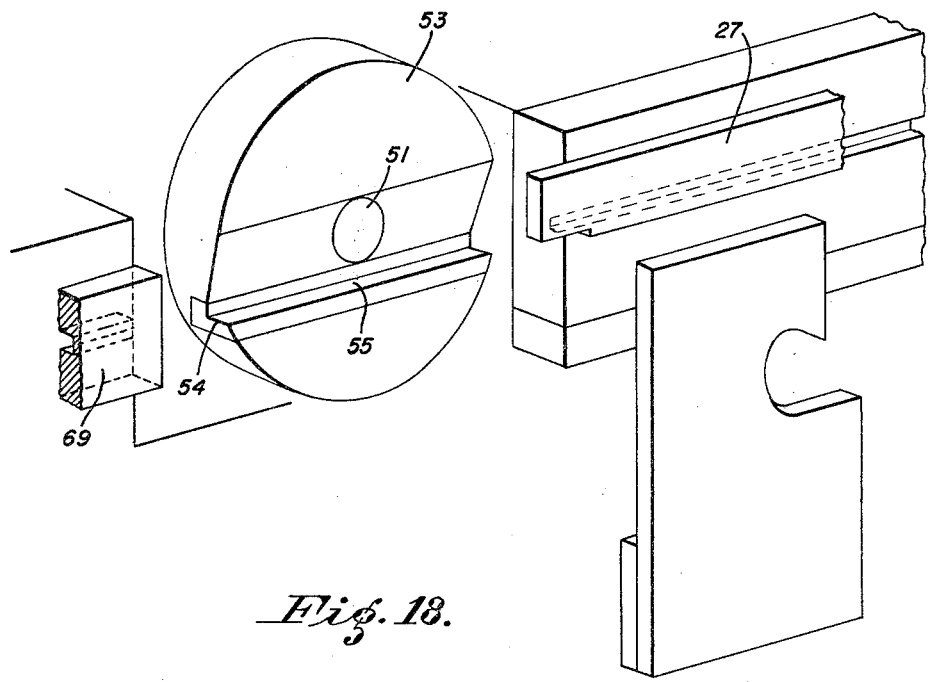

One form of apparatus in accordance with the invention is illustrated in the accompanying drawings in which:

FIGURE 1 is a rear elevation of the apparatus,
FIGURE 2 is a plan view corresponding to FIGURE 1,
FIGURE 3 is a scrap view of the marginal part of a length of support material, to a larger scale,
FIGURE 4 is an end view corresponding to FIGURE 3,
FIGURE 5 is a side view of one of the guide units showing the stand in section and the controlling cam,
FIGURE 6 is a front elevation of a part of the apparatus showing the cord guide passageway for the marginal cord nearest to the wire-feed means,
FIGURE 7 is a rear elevation of a dividing unit and associated cams and cam-shaft,
FIGURE 8 is a section along the line 8—8 of FIGURE 7, to a slightly reduced scale,
FIGURE 9 is a rear elevation corresponding to FIGURE 6, but to a slightly reduced scale,
FIGURE 10 is a section along the lines 10—10 in both FIGURES 6 and 9, to an enlarged scale,
FIGURE 11 is a scrap plan view similar to that in FIGURE 2, but to a larger scale, and modified by the inclusion of a dividing unit,
FIGURE 12 is an end elevation of the ratchet drive mechanism, being a view in the direction of the arrow 12 in FIGURES 1 and 2, the cover plate being removed,
FIGURE 13 is a section through the wire feed means and feed control means, being generally along the lines 13—13 of FIGURES 1 and 2,
FIGURE 14 is a plan view of a guide unit and associated part, corresponding to FIGURE 5,
FIGURE 15 is a front view of a guide unit and associated parts, taken along line 15—15 of FIGURE 14,
FIGURE 16 is a section through the wire brake and brake control means taken along line 16—16 of FIG. 17,
FIGURE 17 is a plan view largely corresponding to the front and rear views shown in FIGURES 6 and 9 respectively, and
FIGURE 18 is a diagrammatic exploded view illustrating the components of the wire cutting and looping assembly illustrated in FIGURE 10.

The apparatus illustrated the base of the machine comprises a stand on which are mounted a row of units, which units take the form of guide units and looping units and may include one or more dividing units. The stand is generally indicated by the reference numeral 20. Incorporated in the base is a transverse bed 21, clearly seen in FIGURES 5 and 8, provided on its upper, front and rear faces with T slots 22 extending for the full width of the bed 21. The units are mounted on the bed with the aid of locking tenons 23 and locating tenons 24, whose function is clear from the drawings.

The guide units are generally indicated by the reference numeral 25 and, as best seen in FIGURES 5, 14 and 15 the front face of each guide unit has machined in it a horizontal channel 26 of square cross section, this being of a size sufficient to admit the wire with a small clearance. The channel 26 in each guide unit forms part of an open mouthed wire guide channel which extends along the row of guide units. Shutter means are provided on each guide unit to close the open mouthed channel 26 as hereinafter described. The shutter means comprise a shutter 27 flexibly suspended, by means of link 28, from the forward end of a rocker arm 29 which is pivoted at 30 to the upper rear part of the guide unit and has a downwardly extending portion 31 having a terminal follower roller 32 to be engaged by a cam 33 on a camshaft 34 extending along the length of the bed 21 a short way behind it. The cam 33 operates to raise the shutter 27 against the action of the return spring 35.

Adjacent sides of each pair of adjacent guide units 25 are recessed, as at 36, so that pairs of recesses together define a cord guide passageway transverse to the wire guide channel and communicating at its forward end with this channel.

At one end of the bed there is a gearbox 37 containing spindles driven by any convenient means such as electric motor 38 disposed beneath the gearbox in one leg of the stand, and supplying the drive to the main camshaft 34 mentioned above. This gearbox also embodies the drive for a pair of wirefeed rollers 39 and 40 which are mounted one above the other in a vertical plane including the wire guide channel. The upper feed roller 39 is driven by means of a fixed spindle 41 rotating in suitable bearings in the wall of gearbox 37. The lower feed roller 40 is driven by means of spindle 42 rotating in bearing 43 mounted so as to allow a small vertical movement enabling spacing between the wire engaging faces of the rollers to be variable. The spacing is varied by feed control means comprising a rocker arm 44, pivoted at 45 to the stand connected to bearing 43, and having at its rear end a follower roller 46 engaging a cam 47 keyed to the main camshaft 34, the rollers normally being urged apart by compression spring 48. The cam 47 has an adjustable part 49 such that the length of the high portion of the cam may be varied.

In use wire from a suitable stock passes between the feed rollers 39 and 40, and the rollers are continuously operated, as is the main camshaft 34. The rollers are thus brought into nipping engagement with the wire and separated to stop wire feed, alternately, and the length of wire fed on each occasion may be varied by suitable adjustment of the cam 47 and its associated part 49. In order to provide a greater range of wire lengths the spindles 41 and 42 are driven through the intermediary of change wheels disposed in the gearbox extension 50 shown in FIGURE 2. The arrangement of gears in the gearbox 37 and change wheels forms no part of the present invention and may take any desired form; their working is therefore not illustrated.

At each end of the row of guide units is a unit which will for convenience be termed a looping unit, and which includes wire severing means and means for crimping the ends of the severed lengths of wire to the marginal cords. That looping unit adjacent to the wire-feed means is shown in detail in FIGURES 6, 9, 10 and 18, but it will be understood that the other looping unit is similar. The looping unit shown has a rotatable member mounted in it extending in a direction parallel with the cord guide passageways defined by recesses 36, and perpendicular to the wire guide channel. The member has an axial passageway 51 serving as a guide for one of the marginal cords, as hereinafter described, and comprises a shaft part 52 having a disc 53 at its forward end. The disc 53 is formed with a shoulder 54 defining a groove 55 tangential to the passageway 51 and forming an extension to the wire guide channel. The rear end of the shaft part 52 carries a pinion 56 engaged by a horizontally reciprocable rack 57. The rack is mounted in guide 58 secured to the main body 59 of the looping unit and connected by link 60 to arm 61 pivoted at 62 so as to swing in a vertical plane. The arm 61 carries a cam follower roller 63 engaging the side walls of a groove 64 in a cam 65 keyed to the main camshaft 34. Rotation of the camshaft 34 thus causes rotation of the rotatable member first in one sense and then in the other, the member being urged to return to the normal position. The rotatable member is prevented from rotation beyond its normal position under the influence of spring 66 by the engagement between a projection 115 on a collar 116 keyed to the rotatable member and an adjustable stop 117. The main body 59 of the looping unit also carries a wire guide 69 which extends between the disc 53 and a point closely adjacent to the nip between the wire feed rollers 39 and 40.

On rotation of the rotatable member the shoulder 54 first co-operates shearwise with a shearing block formed by the adjacent edge of the wire guide 69 to sever the wire and then carries the end portion of the wire round the cord extending through passageway 51, to crimp it round the cord.

A wire brake and brake control means are also provided in the looping unit adjacent to the wire feed means, synchronised with the wire feed means to prevent inadvertent wire feed occurring on separation of the rollers 39 and 40. The wire brake comprises a reciprocable rod 70 mounted in the main body 59 of the looping unit and pivotally connected at its rear end 71 to rocker arm 72, pivoted at 73 and co-operating at its lower end with cam 74 on the main camshaft 34. The rod 70 is spring-urged into engagement with the wire in the wire guide 69 during the period that the wire feed rollers 39 and 40 are separated.

On the forward side of the bed 21 are the support material advance means. These comprise pairs of opposed cord-engaging rolls, an upper roll 75 and a lower roll 76, in line with each cord guide passageway. The lower rolls 76 are all mounted on a common keyed shaft 77 extending parallel with the bed and the main camshaft 34, and the upper rolls 75 are carried on individual arms 78 freely pivoted on a second keyed shaft 79 parallel to the shaft 77, each of the upper rolls 75 being driven from the shaft 79 by spur gears 80 and 81 connected to the shaft 79 and rolls 75 respectively. Each of the arms 78 carries a rearward extension 82 engaged by a spring 83 mounted on an adjacent unit, so that the upper rolls 75 are urged downwardly to grip the associated cord passing between its periphery and that of the corresponding lower roll 76.

The two keyed shafts 77 and 79 are geared through an intermediate gear at each end so as to rotate in the same direction. The shaft 77 is driven intermittently from the main camshaft by the mechanism shown in FIGURE 12 housed at that side of the apparatus remote from the gearbox 37. The figure shows a cam 84 secured to the end of the main camshaft 34 and engaged by a follower 85 which actuates a pawl 86 engaging a ratchet wheel 87 on the end of shaft 77 so that it is advanced one tooth for each rotation of the main camshaft. In an alternative, not illustrated, the drive is made of infinitely variable stroke by using, for example, an eccentric or cam on the camshaft to reciprocate a lever which angularly oscillates a one-way clutch on the shaft 77. In such an arrangement the point of action on this lever, which is adjustable, controls the angle of oscillation and hence the amount of rotation of the shaft 77 and the rolls 75 and 76. In either case the amount of rotation of the shaft 77 controls the distance between adjacent wires of the support material.

In FIGURE 12 there is also shown a sprocket wheel 88 secured to the main camshaft 34 and connected by means of chain 89 to sprocket wheel 90. This latter sprocket wheel is mounted on a short shaft extending through the mechanism casing and having a pulley 91 mounted on its other end as seen in FIGURE 2. A band 92 passing over this pulley transmits rotation to a tube extending for the full width of the bed 21 beneath the keyed shaft 79 and immediately in front of rolls 76, which tube engages the upper face of the support material as it emerges from between rolls 75 and 76 thereby assisting its advance, preventing bunching of the material.

The apparatus shown in FIGURES 1 and 2 is set up to produce support material substantially equal in width to the length of the bed 21. The material is shown in detail in FIGURES 3 and 4 and will be seen to comprise longitudinally extending cords 94, of paper cord, linked by transverse wires 95 which pierce the intermediate cords and are crimped round the marginal cords, as at 96. It will be noted that the wires do not pass through the two marginal cords, but just above or below them, and the bending of the cut end round the cord firmly secures the wire and also leaves the sharp end pointing inwards in the plane of the supporting material, so that it will not catch on the fabric of the mattress or article in which the material is eventually incorporated. If desired, of course, the wires 95 may pierce the marginal cords. The support material is shown as including a strip of hessian or like fabric 97, also pierced by the wires 95, and enabling the material to be readily secured as by sewing to the mattress or other article in which it is to be incorporated.

The operation of the apparatus is as follows:

Paper cords 94 are fed from reels, not shown, into the cord guide passageways formed between adjacent guide units and through the two passageways 51 in the looping units, and wire is led from a suitable stock through wire guide 98 to the wire feed rollers 39 and 40. Further, hessian strip is fed from a device 93 which folds it into the desired configuration. When the machine is set in motion the feed rollers rapidly drive the wire along the wire guide channel, the shutters being closed, and it passes through each of the intermediate cords. The rollers are then separated, by the means previously described, to stop the wire feed, but they continue to rotate. The arrangement is such that the end of the wire just passes beyond the far looping unit. As the wire feed stops the wire brake is operated to prevent further, inadvertent wire feed. Continued rotation of the main camshaft 34 causes rotation of the rotatable members in the looping unit, as previously described, thus severing a length of wire from the stock and trimming the free end. The end portions of the wire are then crimped to the marginal cords.

Next the shutters are raised to open the mouth of the wire guide channel, and the support material is advanced by the rotation of rolls 75 and 76 which draw the cords through the cord guide passageways a distance equal to the spacing between adjacent wires. Lastly the shutters close the mouth of the channel and whole cycle is repeated.

It will be appreciated that by selecting guide units of approproate width it is possible to adjust the spacing between the cords, and that the number of cords used and the total width of the support material may be varied as desired. Thus in a typical apparatus using units 5", 6" and 7" wide, suitable selection of units enables support material, at least within the normally most useful range of from 14" to 60", to be made any integral number of inches wide. The provision of the slotted bed 21 and the keyed or splined engagement between cams and other rotating parts adjacent to the bed enables the setting up to be varied with the minimum of difficulty. In fact a particular feature of the apparatus is its flexibility.

To illustrate this a further example of the use of the apparatus is shown in FIGURE 11. This figure shows a part of the apparatus set up for the simultaneous production of two lengths of support material side-by-side. This is accomplished with the aid of a dividing unit indicated generally by the reference numeral 99. The dividing unit is shown in greater detail in FIGURES 7 and 8. This unit is, in effect, two looping units arranged side-by-side to assist in the formation of the margins of adjacent lengths of support material. Thus the dividing unit comprises a main body part 100, adapted to be secured to the bed 21, in which are mounted a pair of rotatable members 101, each similar to that in each of the looping units. The members 101 are rotated by vertically reciprocable racks 102 engaging pinions similar to pinions 56. The racks are each provided with cam-engaging projections 103 which come into contact with the high portions of cams 104 on the main camshaft 34. The racks and rotatable members 101 are returned to their original positions, after each actuation, by the springs 105 and 111 respectively.

The shoulders at the forward end of the rotatable members 101 engage shearwise with a shear block 106 to sever the wire, and a short length of sheared wire is thus left between the lengths incorporated in the support material. This short length of wire is ejected from beneath the block 106 by ejector means comprising an ejector 107 adapted to be pushed forward by arm 108 pivoted at 109 and engaged by cam 110 on the camshaft 34. As clearly seen in FIGURE 8 the forward end of the ejector 107 is tapered and in its forward movement depresses the wire supporting part 112. After actuation the ejector is returner by spring 113 and the wire supporting part by spring 114.

Two pairs of material advancing rolls 123 and 124 are associated with the dividing unit, each pair engaging the cord passing through one of the rotatable members 101. The upper rolls 123 are mounted on a common arm 118, serving a purpose similar to the arm 78 associated with the guide units and looping units and are connected to a common spindle 119. A spur gear 120 is also mounted on this spindle and engages a corresponding spur gear 121 on the keyed shaft 79. The spur gears function in a manner similar to those numbered 80 and 81 previously described. In addition the arm has an extension 122 functioning like the extension 82 on each arm 78. It will be seen from FIGURES 8 and 11 that the rolls 123 and 124 associated with the dividing unit differ somewhat from the corresponding rolls 75 and 76 in that their edges are discontinuous. The arrangement is such that the marginal cords are engaged by the edges but that the crimped ends of the transverse wires pass between the discontinuities in the edges. Similarly the rolls associated with the looping units are formed with discontinuous edges being identical in form to the rolls 123 and 124. The upper roll 125 of such a pair, associated with a looping unit, is shown in FIGURE 11.

If it is required to manufacture three or even more lengths of support material simultaneously two or more dividing units together with their associated parts may be provided.

Each of the lengths of support material shown in FIGURE 11 is shown as including two strips of hessian or like material 126. In order to assist the passage of these strips through the apparatus there are provided pairs of co-operating knurled tamping rollers 127 mounted and driven in a manner similar to the material advance rolls 75 and 76, differing only in the absence of spring means urging the upper roller towards the lower roller.

The operation of the apparatus, when set up in this manner is similar to that described with reference to the production of a single length of support material, the rotatable members 101 operating in unison with the members in the looping units. In addition, however, the ejector means operate immediately after the rotatable members, in the manner previously described.

Whilst the support material produced by the apparatus may be folded or rolled and stored until it is required for use, the apparatus may conveniently be used in conjunction with a machine for cutting it into pieces of any convenient predetermined length. Such a machine may comprise a table, having, near its further end, a feeler under which one of the cords of the material is guided. The feeler responds to contact with the cord to operate a bar which clamps the material along a transverse line some way closer to the support material manufacturing apparatus than the feeler. A series of simultaneously operated secateurs which cut the cords adjacent to the clamping bar are next brought into operation, together with shears for cutting any hessian or like strips in the material. The cut piece of support material is then rapidly carried away by moving bands running over the table and finally the mechanism resets itself ready to receive the freshly cut end of the material.

The whole machine may conveniently be operated pneumatically, and the position of the feeler may be adjustable, as may the positions of the secateurs and shears to enable the length of the pieces of material to be varied as desired and to accommodate any spacings of the cords and strips in the material as may result from the particular way in which the apparatus is set up.

We claim:

1. Apparatus for assembling support material in the form of a grid of longitudinally extending cords linked by transversely extended wires, said apparatus comprising a stand, a row of individual, interchangeable, guide units each releasably secured to the stand and each having formed therein part of an open mouthed wire guide channel extending along the row and having its mouth facing the direction of support material advance, the guide units also having cord guide passageways transverse to the wire guide channel and communicating therewith, wire feed means operating intermittently to insert a length of wire stock endwise into the wire guide channel, wire severing means located between the wire feed means and the wire guide channel and operating to sever the length of wire after insertion, means for crimping the ends of severed length of wire to the marginal cords, means for advancing the assembled material after the length of wire has been severed, shutter means for each of said guide units movably positioned across the mouth of the guide channel to close the mouth of the wire guide channel intermediate the cord guide passageways, and shutter operating means for closing said shutter means when the wire feed means are to be operated and to open said shutter means when the means for advancing the assembled material are operated.

2. Apparatus according to claim 1 and including means for enabling at least two lengths of support material to be manufactured simultaneously, said means comprising at least one dividing unit releasable secured in the row of guide units and serving to separate the guide units into sets, wire severing means on the dividing unit for severing the length of wire after insertion into shorter strands and wire crimping means on the dividing unit for crimping the severed ends of the strands to the adjacent marginal cords of the supports.

3. A dividing unit for use in apparatus for assembling support material in the form of a grid or longitudinally extending cords linked by transversely extending wires and enabling two lengths of support material to be assembled simultaneously, said dividing unit comprising a body having a wire guide channel extending from side to side of the body, a pair of wire severing and crimping means on the body, each such means comprising a rotatable member having an axial cord guide passageway opening into the wire guide channel, a wire engaging shoulder on each rotatable member defining a part of the wire guide channel, a shearing block on the body between the rotatable members and cooperating with each shoulder, and means for rotating the rotatable members so that each shoulder first co-operates with the associated shearing block to shear a short length of wire between the rotatable members and a length of wire in the wire guide channel and then crimps the severed end of the wire in the guide channel round the cord in the cord guide passageway.

4. A dividing unit according to claim 3 in which ejector means are provided on the body operable to eject the short length of sheared wire from that part of the wire guide channel between the rotatable members.

5. In an apparatus for assembling support material in the form of a grid or longitudinally extending cords linked by wires extending transversely through the cords and having means in the form of a plurality of guide units for guiding the cords and wires, wire feed means operating intermittently to insert a length of wire stock endwise through the cords, wire severing means operable to sever the length of wire after insertion, means for crimping the ends of the severed lengths of wire to marginal cords, and means for advancing the assembled material after the length of wire has been severed, the improvement wherein each of said guide units comprises: a body having an open ended wire guide channel extending from side to side thereof, said channel having an opened mouth facing in the direction of support material feed, said body also having a cord guide recess in each side thereof opening into said wire guide channel and to form cord guide passageways when the guide units are positioned in side-by-side relationship; a shutter movably positioned across the mouth of said guide channel intermediate said cord guide recesses; and shutter operating means for closing said shutter when the wire feed means is to be operated and to open said shutter when the means for advancing the assembled material is to be operated.

References Cited in the file of this patent

UNITED STATES PATENTS

| | | |
|---|---|---|
| 989,199 | Smith | Apr. 11, 1911 |
| 1,085,594 | Craven | Feb. 3, 1914 |
| 2,218,749 | Heilman | Oct. 22, 1940 |
| 2,218,758 | Leal | Oct. 22, 1940 |
| 2,737,208 | Harter | Mar. 6, 1956 |
| 2,800,151 | Shockey | July 23, 1957 |